US011373084B2

(12) United States Patent
Liu et al.

(10) Patent No.: US 11,373,084 B2
(45) Date of Patent: *Jun. 28, 2022

(54) APPARATUS AND METHODS FOR FORWARD PROPAGATION IN FULLY CONNECTED LAYERS OF CONVOLUTIONAL NEURAL NETWORKS

(71) Applicant: Cambricon Technologies Corporation Limited, Beijing (CN)

(72) Inventors: Shaoli Liu, Beijing (CN); Huiying Lan, Beijing (CN); Qi Guo, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 857 days.

This patent is subject to a terminal disclaimer.

(21) Appl. No.: 16/174,185

(22) Filed: Oct. 29, 2018

(65) Prior Publication Data

US 2019/0065934 A1    Feb. 28, 2019

Related U.S. Application Data

(63) Continuation of application No. PCT/CN2016/080968, filed on May 4, 2016.

(30) Foreign Application Priority Data

Apr. 27, 2016   (CN) .......................... 201610270004.0

(51) Int. Cl.
*G06N 3/04*    (2006.01)
*G06N 3/02*    (2006.01)
(Continued)

(52) U.S. Cl.
CPC ............. *G06N 3/04* (2013.01); *G06F 9/3001* (2013.01); *G06F 9/30036* (2013.01);
(Continued)

(58) Field of Classification Search
CPC ..... G06F 9/30036; G06F 9/3885; G06N 3/02; G06N 3/04
See application file for complete search history.

(56) References Cited

U.S. PATENT DOCUMENTS 10,410,112 B2 *   9/2019   Liu .......................... G06N 3/04

FOREIGN PATENT DOCUMENTS

CN      103680496 A      3/2014
CN      104376389 A      2/2015
(Continued)

OTHER PUBLICATIONS

EP 16899898.7—Communication under Article 94(3) EPC, dated Feb. 24, 2020, 9 pages.
(Continued)

*Primary Examiner* — Zachary K Huson
(74) *Attorney, Agent, or Firm* — Getech Law LLC; Jun Ye

(57) ABSTRACT

Aspects for forward propagation in fully connected layers of a convolutional artificial neural network are described herein. The aspects may include multiple slave computation modules configured to parallelly calculate multiple groups of slave output values based on an input vector received via the interconnection unit. Further, the aspects may include a master computation module connected to the multiple slave computation modules via an interconnection unit, wherein the master computation module is configured to generate an output vector based on the intermediate result vector.

20 Claims, 7 Drawing Sheets

(51) Int. Cl.
*G06F 9/30* (2018.01)
*G06F 9/38* (2018.01)
*G06F 12/0875* (2016.01)
*G06F 13/28* (2006.01)

(52) U.S. Cl.
CPC .......... *G06F 12/0875* (2013.01); *G06F 13/28* (2013.01); *G06N 3/02* (2013.01); *G06F 9/3885* (2013.01); *G06F 2212/452* (2013.01)

(56) References Cited

FOREIGN PATENT DOCUMENTS

| CN | 105184366 A | 12/2015 |
| CN | 105488565 A | 4/2016 |
| CN | 105512723 A | 4/2016 |
| WO | WO 2017/185387 A1 | 11/2017 |

OTHER PUBLICATIONS

EP 16899898.7—Response to Communication under Article 94(3) EPC, filed Jun. 24, 2020, 26 pages.
Ramon J. Aliaga, et al., "System-on-Chip Implementation of Neural Network Training on FPGA", International Journal of Advances in Systems and Measurement, 2009, 12 pages.
Pedro O. Domingos, et al., "An Efficient and Scalable Architecture for Neural Networks With Backpropagation Learning" IEEE, 2005, 6 pages.
CN 201610270004.0—Second Office Action, dated Mar. 10, 2020, 7 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
201610270004.0—Office Action, dated Jun. 3, 2019, 11 pages. (no English translation).
201811221557.2—Office Action, dated Jun. 5, 2019, 10 pages. (no English translation).
EP 16899898.7—European Search Report, dated Feb. 24, 2020, 7 pages.

\* cited by examiner

APPARATUS AND METHODS FOR FORWARD PROPAGATION IN FULLY CONNECTED LAYERS OF CONVOLUTIONAL NEURAL NETWORKS

CROSS-REFERENCE TO RELATED APPLICATIONS

The present invention is a continuation-in-part of PCT Application No. PCT/CN2016/080968, filed on May 4, 2016, which claims priority to commonly owned CN application number 201610270004.0, filed on Apr. 27, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities.

A known method to support the forward propagation of a multilayer artificial neural network is to use a general-purpose processor. Such a method uses a general-purpose register file and a general-purpose functional unit to execute general-purpose instructions to support algorithms in MNNs. However, one of the defects of the method is low operational performance of a single general-purpose processor which cannot meet performance requirements for usual multilayer neural network operations. When multiple general-purpose processors execute concurrently, the intercommunication among them also becomes a performance bottleneck. In addition, a general-purpose processor needs to decode the reverse computation of a multilayer artificial neural network into a long queue of computations and access instruction sequences, and a front-end decoding on the processor brings about higher power consumption.

Another known method to support the forward propagation of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. Since GPU is an apparatus specially for executing graph and image operation as well as scientific computation and fails to specially support multilayer artificial neural network operations, the GPU remains in need of a great amount of front-end decoding to execute multilayer artificial neural network operations, thus producing plenty of additional overheads. Besides, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes examples for forward propagation in fully connected layers of a convolutional artificial neural network. An example apparatus for forward propagation in fully connected layers of a convolutional artificial neural network may include multiple slave computation modules configured to parallelly calculate multiple groups of slave output values based on an input vector received via the interconnection unit. The example apparatus may further include a master computation module connected to the multiple slave computation modules via an interconnection unit, wherein the master computation module is configured to receive an intermediate result vector combined by the interconnection unit based on the multiple groups of slave output values calculated by the multiple slave computation modules, and to generate an output vector based on the intermediate result vector.

An example method for forward propagation in fully connected layers of a multilayer neural network may include parallelly calculating, by multiple slave computation modules, multiple groups of slave output values based on an input data vector received via an interconnection unit. The example method may further include combining, by the interconnection unit, the multiple groups of slave output values to generate an intermediate result vector. Further still, the example method may include generating, by a master computation module, an output vector based on the intermediate result vector.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are a lot specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

The forward propagation computation of multilayer artificial neural networks according to embodiments of the present disclosure comprises operations in two or more layers. For each layer, a dot product operation may be performed to an input vector and a weight vector and from the result is obtained an output neuron through an activation function. The activation function may be sigmoid function, tan h function, relu function, softmax function, etc.

Figure 1A:
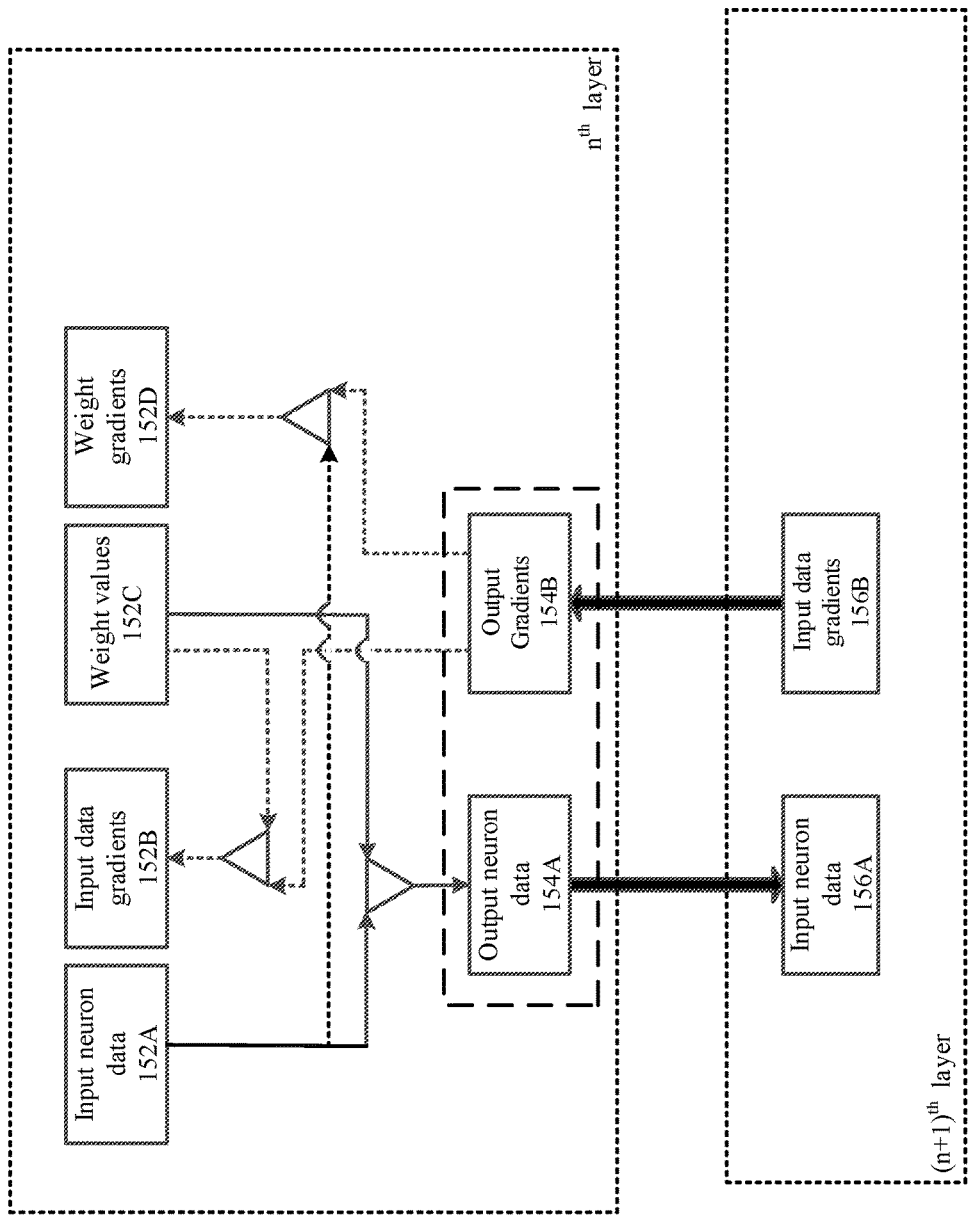
FIG. 1A is a block diagram illustrating an example computing process for MNNs.

FIG. 1A is a block diagram illustrating an example computing process 100 at an MNN acceleration processor for neural networks. The computing process 100 is a merely example showing neural network operations that involve input data and weight values and should not be limited to such operations. For example, other unshown neural network operations may include pooling operations, etc.

As depicted, the example computing process 100 may be performed from the $n^{th}$ layer to the $(n+1)^{th}$ layer. The term "layer" here may refer to a group of operations, rather than a logic or a physical layer. A triangular-shaped operator (A as shown in FIG. 1A) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire process. Rather, the layers of operations may refer to any two consecutive layers in a neural network. As described below in greater detail, the computing process from the $n^{th}$ layer to the $(n+1)^{th}$ layer may be referred to as a forward propagation process; the computing process from $(n+1)^{th}$ layer to the $n^{th}$ layer may be referred to as a backward propagation (also may be interchangeably referred to as backpropagation) process.

The forward propagation process may start from input neuron data received at the $n^{th}$ layer (e.g., input neuron data 152A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 152A may be multiplied or convolved by one or more weight values 152C. The results of the multiplication or convolution may be transmitted as output neuron data 154A. The output neuron data 154A may be transmitted to the next layer (e.g., the $(n+1)^{th}$ layer)) as input neuron data 156A. The forward propagation process may be shown as the solid lines in FIG. 1A.

The backward propagation process may start from the last layer of the forward propagation process. For example, the backward propagation process may include the process from the $(n+1)^{th}$ layer to the $n^{th}$ layer. During the process, the input data gradients 156B may be transmitted to the $n^{th}$ layer as output gradients 154B. The output gradients 154B may then be multiplied or convolved by the input neuron data 152A to generate weight gradients 152D. Additionally, the output gradients 154B may be multiplied by the weight values 152C to generate input data gradients 152B. The backward propagation process may be shown as the dotted lines in FIG. 1A.

Figure 1B:
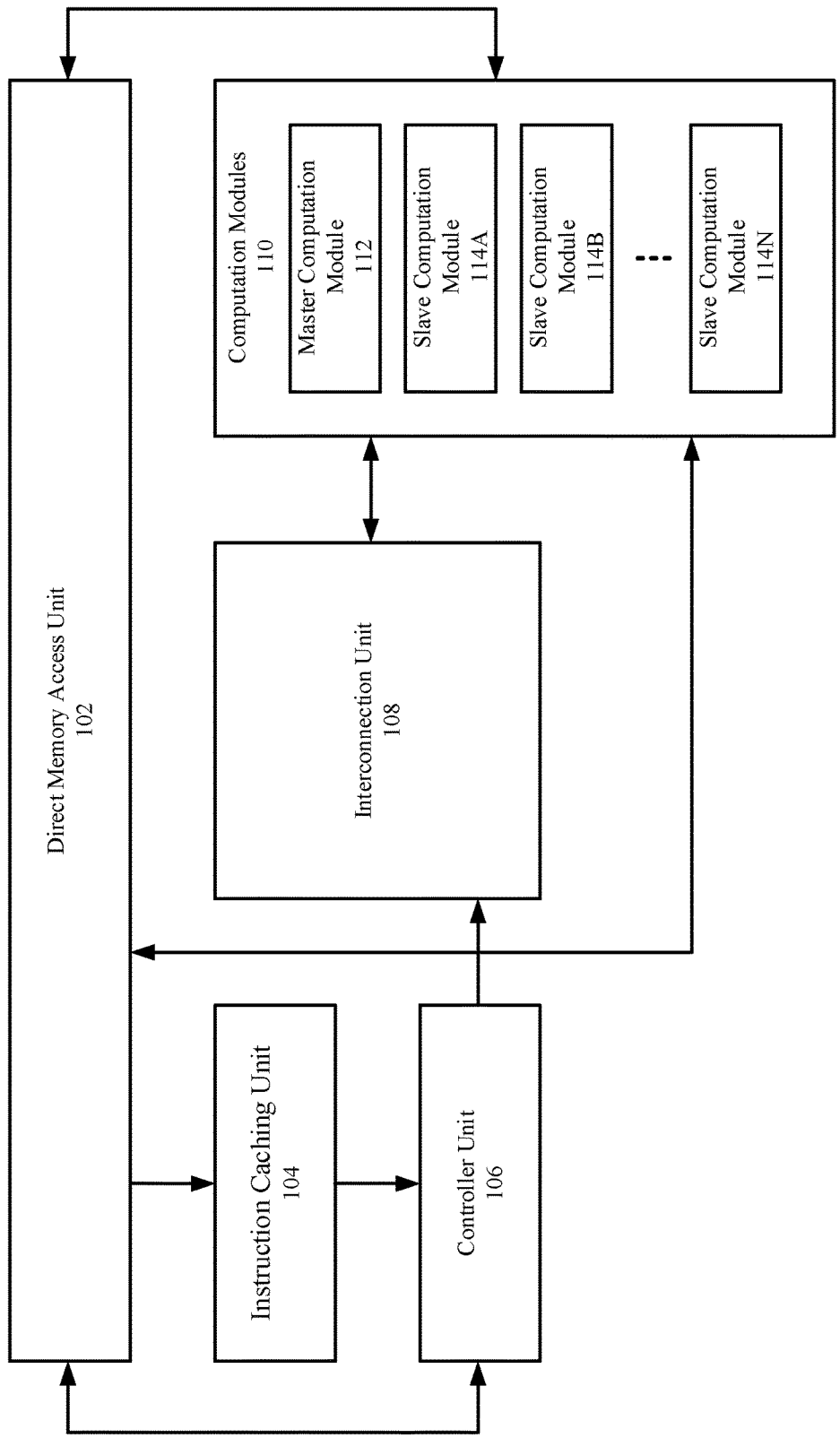
FIG. 1B illustrates a block diagram of the overall structure of the apparatus for performing a forward propagation operation of artificial neural networks according to embodiments of the present disclosure.

FIG. 1B illustrates a block diagram of the general structure of the apparatus for performing a forward propagation operation of artificial neural networks according to embodiments of the present disclosure. As shown in FIG. 1B, the apparatus comprises an instruction caching unit 104, a controller unit 106, a direct memory access unit 102, an interconnection unit 108, multiple computation module 110 including a master computation module 112 and multiple slave computation modules 114 (e.g., 114A-114N). The instruction caching unit 104, the controller unit 106, the direct memory access unit 102, the interconnection unit 108, the master computation module 112 and the slave computation modules 114 may be implemented in hardware circuits (for example, an application-specific integrated circuit (ASIC)).

In some examples, the instruction caching unit 104 may be configured to receive or read instructions from the direct memory access unit 102 and cache the received instructions. The controller unit 106 may be configured to read instructions from the instruction caching unit 104 and decode one of the instructions into micro-instructions for controlling operations of other modules including the direct memory access unit 102, the master computation module 112, the slave computation modules 114, etc. In other words, the modules including the direct memory access unit 102, the master computation module 112, and the slave computation modules 114 may be configured to respectively perform the micro-instructions.

The direct memory access unit 102 may be configured to access an external address range (e.g., in an external storage device) and directly read or write data into respective caching units in the multiple computation modules 110.

Figure 2:
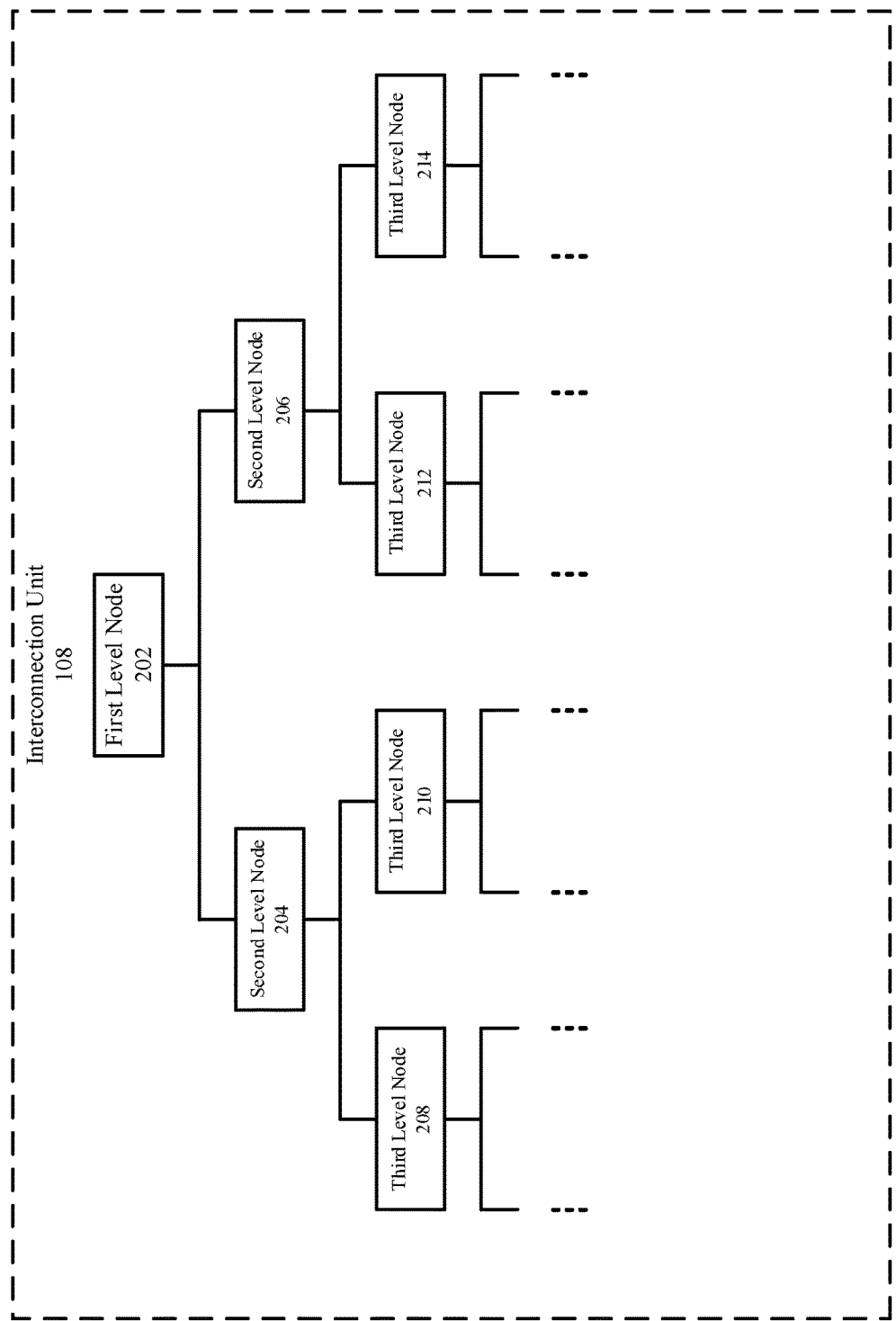
FIG. 2 illustrates the structure of the interconnection unit in the apparatus for performing a forward propagation operation of artificial neural networks according to embodiments of the present disclosure.

FIG. 2 illustrates the structure of the interconnection unit in the apparatus for performing a forward propagation operation of artificial neural networks according to embodiments of the present disclosure. As depicted, the interconnection module 108 may be structured as a binary tree that includes multiple levels (e.g., from the first level to lower levels). Each level may include one or more nodes. Each node may be configured to send data to two nodes at a lower level. Further, each node may combine data received from two nodes at a lower level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level (e.g., a and b) and the sum of the addition (e.g., a+b) may be sent to the node at the high level.

For example, in the initial computing stage of artificial neural networks in each layer, the input data (e.g., input neuron data 152A) may be transmitted to respective slave computation modules 114 by the master computation module 112 via the interconnection unit 108. In at least some examples, the input data may refer to an input vector.

When the computation process of the slave computation modules 114 completes, the respective result of the computation process at each of slave computation modules 114 may be output as a slave output value. The slave output values may be transmitted to the interconnection unit 108 and combined by the interconnection unit 108 into an intermediate result vector.

Taking a full connection layer of the neural network as an example, with respect to an $n^{th}$ layer, the length of the input vector may be represented as $L_i$ and the length of the output vector may be represented as $L_{i+1}$.

The slave output values of the input vector may be combined into an intermediate result vector in the interconnection unit 108. The intermediate result vector may be further processed by the master computation module 112 to generate an output vector.

Figure 3:
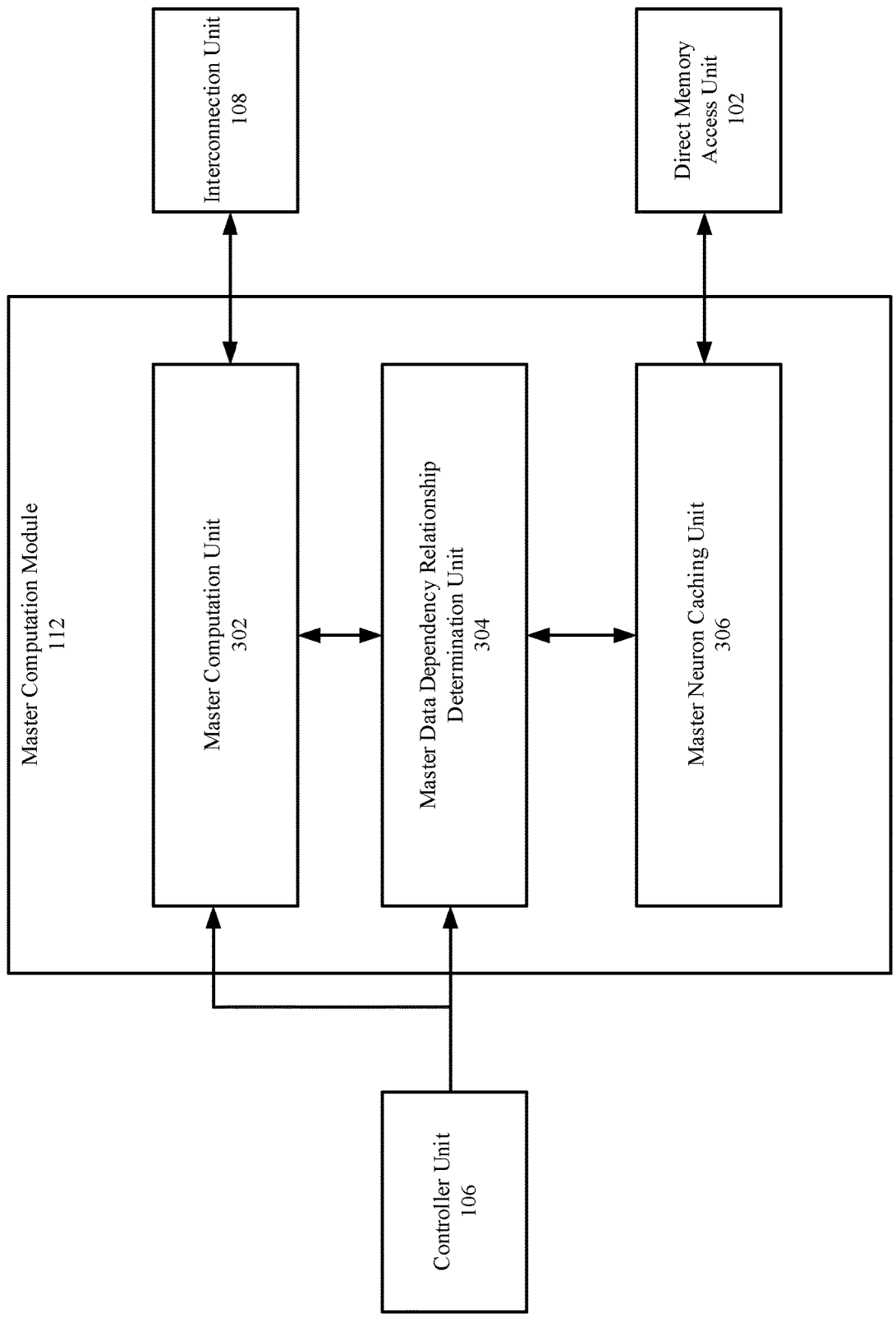
FIG. 3 illustrates a block diagram of the structure of the master computation module in the apparatus for performing a forward propagation computation of artificial neural networks according to embodiments of the present disclosure.

FIG. 3 illustrates a block diagram of the structure of the master computation module in the apparatus for performing a forward propagation computation of artificial neural networks according to embodiments of the present disclosure. As shown in FIG. 3, the master computation module 112 may include a master computation unit 302, a master data dependency relationship determination unit 304, and a master neuron caching unit 306.

The master neuron caching unit 306 is configured to cache the data input and output by the master computation module 112 in the process. The master data dependency relationship determination unit 304 may serve as an interface between the master computation unit 302 and the master neuron caching unit 306. In other words, the master computation unit 302 may be configured to read data from or write data to the master neuron cache unit 306 and to prevent read-write inconsistency of data in the master neuron caching unit 306. Further, the master data dependency relationship determination unit 304 may be configured to transmit the input vector or the segments of the input vector to the slave computation modules 114 via the master computation unit 302. Data output from the slave computation modules 114 may be received by the master computation unit 302 via the interconnection unit 108. Instructions may be transmitted by the controller unit 106 to the master computation unit 302 and the master data dependency relationship determination unit 304 to control their operations.

Figure 4:
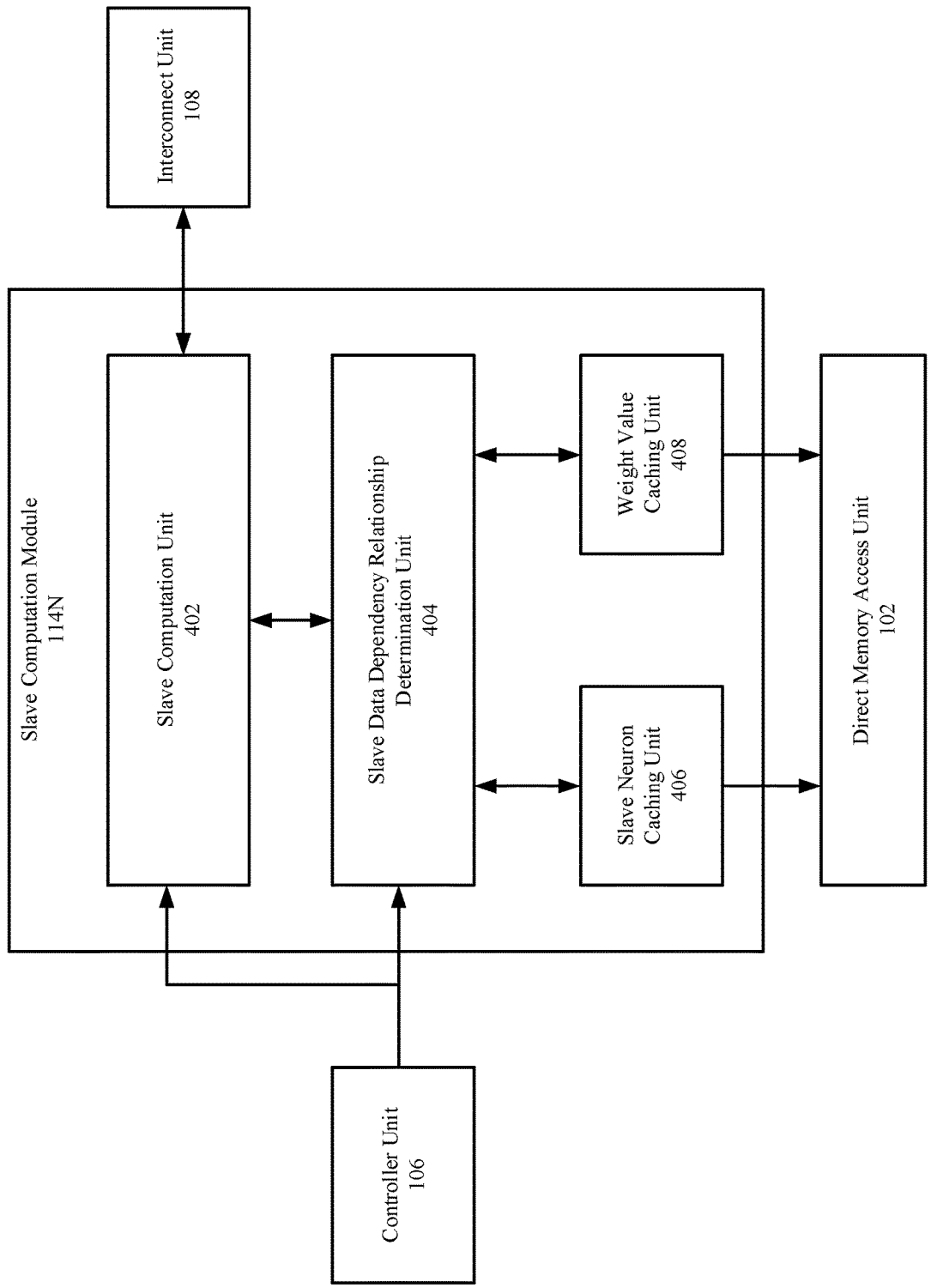
FIG. 4 is a block diagram of the structure of the slave computation modules in the apparatus for performing a forward propagation computation of artificial neural networks according to embodiments of the present disclosure.

FIG. 4 is a block diagram of the structure of the slave computation modules in the apparatus for performing a forward propagation computation of artificial neural networks according to embodiments of the present disclosure. As shown in FIG. 4, each slave computation module 114 may include a slave computation unit 402, a slave data dependency relationship determination unit 404, a slave neuron caching unit 406, and a weight value caching unit 408.

The slave computation unit 402 may be configured to receive micro-instructions transmitted from the controller unit 106 and to perform arithmetic and/or logical operations. The slave data dependency relationship determination unit 404 may be configured to perform reading/writing operations to the slave neuron caching unit 406. Before performing the reading/writing operations, the slave data dependency relationship determination unit 408 may be configured to determine that there is no conflict in the reading/writing consistency in the data used by the micro-instructions. For example, all micro-instructions transmitted to the slave data dependency relationship determination unit 404 may be stored in an instruction queue within the slave data dependency relationship determination unit 404. The instruction queue may indicate the relative priorities of the stored micro-instructions. In this instruction queue, if the range to be read indicated by the reading micro-instruction conflicts with the range to be written according to the writing micro-instruction of higher priority in the front of the instruction queue, then the reading micro-instruction cannot be executed unless the writing instruction that it depends on is executed.

The slave neuron caching unit 406 may be configured to cache the input vector and the slave output value generated by the slave computation unit 402.

The weight value caching unit 408 may be configured to cache the weight values for the slave computation unit 402 in the process. For each slave computation module 114, the weight value caching unit 408 may be configured to store a portion of the weight matrix, e.g., a submatrix of the weight matrix.

The slave computation modules 114 may be configured to process portions of the forward propagation computation that may be calculated parallelly. Taking a fully connected layer of the neural network (e.g., the $n^{th}$ layer in FIG. 1A) as an example, the forward propagation process may be represented by out=f(w×in+b), in which w represents the weight matrix, in represents the input vector, b represents a bias value, f ( ) represents an activation function, and out represents the output vector. The input vector and the output vector may both be column vectors. A fully connected layer may refer to a layer of operations that include a matrix of weight values (hereinafter "weight matrix"), each weight value corresponding to an element of the input vector and an element of the output vector. In other words, for any pair of an element of the input vector and an element of the output vector, a weight value can be identified in the weight matrix. For example, the weight matrix may be in the form of $$\begin{pmatrix} w_{11} & w_{12} & w_{13} & \ldots & w_{1j} & \ldots & w_{1L_i} \\ w_{21} & w_{22} & w_{23} & \ldots & w_{2j} & \ldots & w_{2L_i} \\ w_{31} & w_{32} & w_{33} & \ldots & w_{3j} & \ldots & w_{3L_i} \\ \vdots & \vdots & \vdots & \vdots & \vdots & \vdots & \vdots \\ w_{j1} & w_{j2} & w_{j3} & \ldots & w_{jj} & \ldots & w_{jL_i} \\ \vdots & \vdots & \vdots & \vdots & \vdots & \vdots & \vdots \\ w_{L_{i+1}1} & w_{L_{i+1}2} & w_{L_{i+1}3} & \ldots & w_{L_{i+1}j} & \ldots & w_{L_{i+1}L_i} \end{pmatrix}$$

and the input vector may be represented as $$\begin{pmatrix} in_1 \\ in_2 \\ in_3 \\ \vdots \\ in_j \\ \vdots \\ in_{L_i} \end{pmatrix}.$$

The input vector may be transmitted to and stored in the slave computation modules 114.

The slave computation modules 114 may be configured to calculate a result of the multiplication of the weight matrix and the input vector. The multiplication may be represented as $$\begin{pmatrix} W_{11} & W_{12} & W_{13} & \ldots & W_{1j} & \ldots & W_{1L_i} \\ W_{21} & W_{22} & W_{23} & \ldots & W_{2j} & \ldots & W_{2L_i} \\ W_{31} & W_{32} & W_{33} & \ldots & W_{3j} & \ldots & W_{3L_i} \\ \vdots & \vdots & \vdots & \vdots & \vdots & \vdots & \vdots \\ W_{j1} & W_{j2} & W_{j3} & \ldots & W_{jj} & \ldots & W_{jL_i} \\ \vdots & \vdots & \vdots & \vdots & \vdots & \vdots & \vdots \\ W_{L_{i+1}1} & W_{L_{i+1}2} & W_{L_{i+1}3} & \ldots & W_{L_{i+1}j} & \ldots & W_{L_{i+1}L_i} \end{pmatrix} \begin{pmatrix} in_1 \\ in_2 \\ in_3 \\ \vdots \\ in_j \\ \vdots \\ in_{L_i} \end{pmatrix},$$

which may be further shown as $$\begin{pmatrix} W_{11} \cdot in_1 + W_{12} \cdot in_2 + \ldots + W_{1j} \cdot in_j + \ldots + W_{1L_i} \cdot in_{L_i} \\ W_{21} \cdot in_1 + W_{22} \cdot in_2 + \ldots + W_{2j} \cdot in_j + \ldots + W_{2L_i} \cdot in_{L_i} \\ W_{31} \cdot in_1 + W_{32} \cdot in_2 + \ldots + W_{3j} \cdot in_j + \ldots + W_{3L_i} \cdot in_{L_i} \\ \vdots \\ W_{j1} \cdot in_1 + W_{j2} \cdot in_2 + \ldots + W_{jj} \cdot in_j + \ldots + W_{jL_i} \cdot in_{L_i} \\ \vdots \\ W_{L_{i+1}1} \cdot in_1 + W_{L_{i+1}2} \cdot in_2 + \ldots + W_{L_{i+1}j} \cdot in_j + \ldots + W_{L_{i+1}L_i} \cdot in_{L_i} \end{pmatrix}.$$

Each slave computation module 114 may be configured to calculate the multiplication between a row vector in the submatrix with the first segment of the input vector. For example, the $j^{th}$ slave computation module 114J may be configured to calculate the multiplication between the segment $$\begin{pmatrix} in_1 \\ in_2 \\ in_3 \\ \vdots \\ in_j \\ \vdots \\ in_{L_i} \end{pmatrix}$$

and the $j^{th}$ weight row vector $(W_{j1}, W_{j2}, W_{j3}, \ldots W_{jj}, \ldots W_{jL_i})$ to generate a slave output value: $(W_{j1} \cdot in_1 + W_{j2} \cdot in_2 + \ldots + W_{jj} \cdot in_j + \ldots + W_{jL_i} \cdot in_{L_i})$. The weight value caching unit 408 included in the $j^{th}$ slave computation module 114 may be configured to only store the weight values relevant to the multiplication, e.g., the $j^{th}$ weight row vector.

The slave output values generated respectively by the slave computation modules 114 may be output to and combined by the interconnection unit 108 into an intermediate result vector.

The master computation module 112 may be configured to perform one or more operations to the intermediate result vector to generate the output vector. The operations may include adding a bias to the intermediate result vector, pooling (e.g., max-pooling (MAXPOOLING) or average pooling (AVGPOOLING)), activating with an activation function, sampling, etc. The activation function may be sigmoid function, tan h function, relu function, softmax function, etc.

Figure 5:
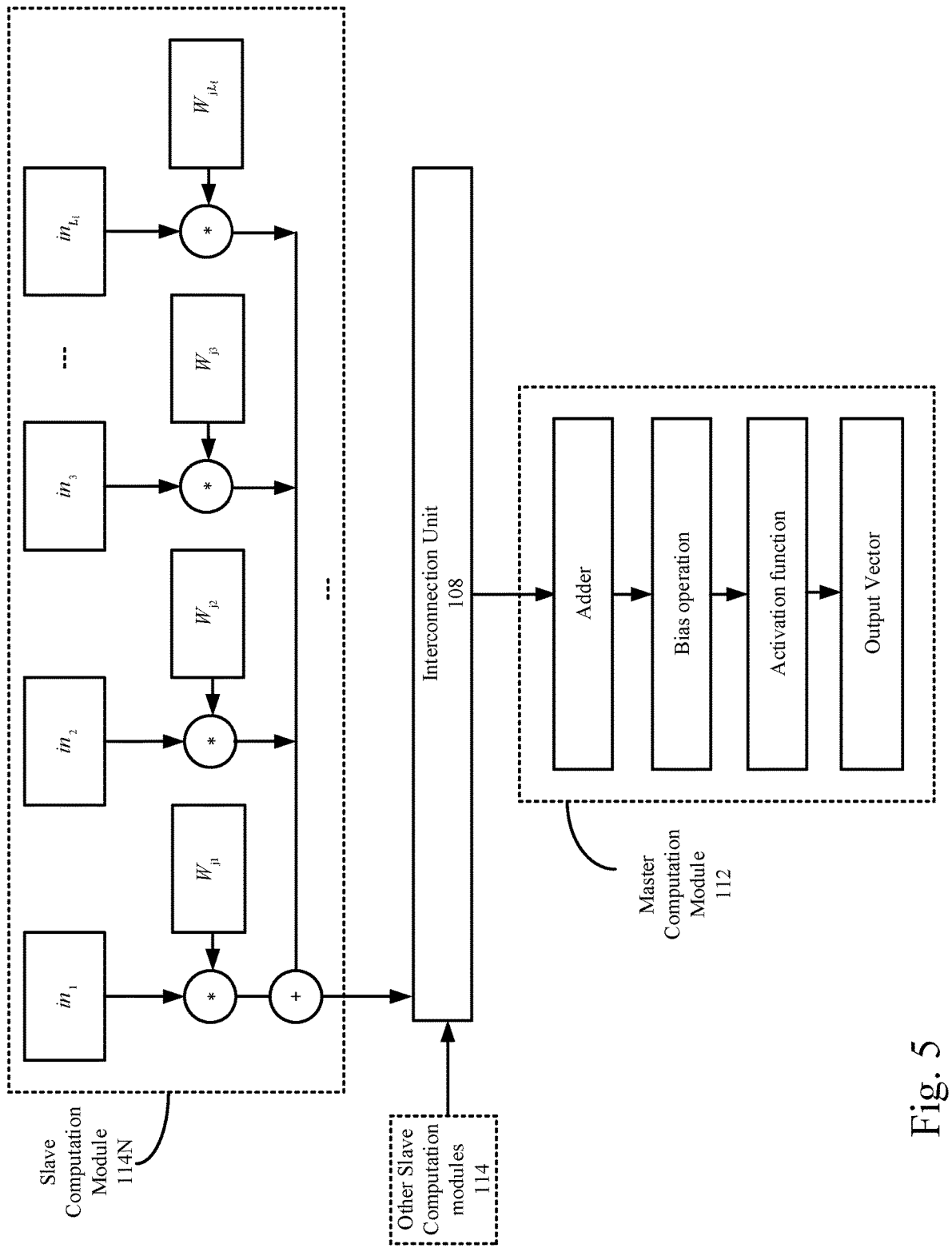
FIG. 5 is a block diagram of the forward propagation computation process of neural networks according to embodiments of the present disclosure.

FIG. 5 is a block diagram of the forward propagation computation process of neural networks according to embodiments of the present disclosure. As described above, a $j^{th}$ slave computation module 114J may be configured to multiply the input vector $$\begin{pmatrix} in_1 \\ in_2 \\ in_3 \\ \vdots \\ in_j \\ \vdots \\ in_{L_i} \end{pmatrix}$$

by the respective weight vector stored in the weight value caching unit 408, e.g., $(W_{j1}, W_{j2}, W_{j3}, \ldots W_{jj}, \ldots W_{jL_i})$, to generate a slave output value. The slave output values may be transmitted to the interconnection unit 108 and combined into an intermediate result vector.

The intermediate result vector may be further transmitted to the master computation module 112. The master computation module 112 may be configured to perform a bias operation by adding a bias value to the intermediate result vector and to apply an activation function to the biased intermediate result vector to generate the output vector.

Figure 6:
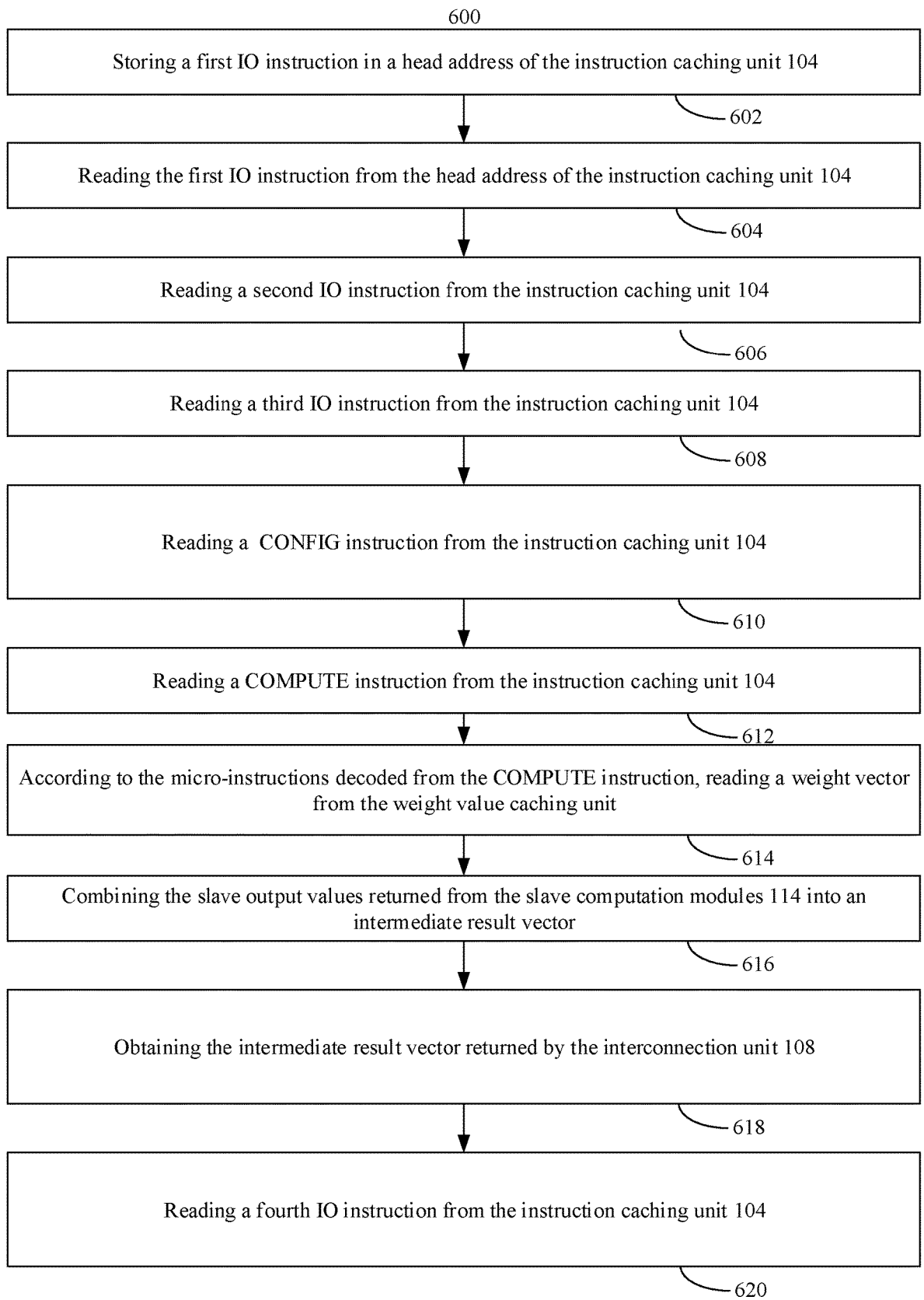
FIG. 6 is a flow diagram of the operation of single-layer artificial neural network according to embodiments of the present disclosure.

FIG. 6 is a flow diagram of a process 600 of single-layer artificial neural network according to embodiments of the present disclosure.

At block 602, a first IO instruction may be pre-stored in a head address of the instruction caching unit 104. The first IO instruction may include information with respect to the reading of the input vector from a first external address space and the writing of the output vector to a second external address space.

At block 604, the controller unit 106 may be configured to read the first IO instruction from the head address of the instruction caching unit 104. The controller unit 106 may be further configured to decode the first IO instruction into one or more micro-instructions. According to the decoded micro-instructions, the direct memory access unit 102 may be configured to read the corresponding instructions for the neural network from an external address space and transmit the instructions to the instruction caching unit 104.

At block 606, the controller unit 106 may be configured to read a second IO instruction from the instruction caching unit 104 and to decode the second IO instruction into micro-instructions. According to the decoded micro-instructions, the direct memory access unit 102 may be configured to read data for the master computation module 112 (e.g., data comprising input vectors, interpolation table, constant table, and bias values etc.) into the master neuron caching unit 306 of the master computation module 112 from an external address space, e.g., an external storage device.

At block 608, the controller unit 106 may be configured to read a third IO instruction from the instruction caching unit 104 and decode the third IO instruction into micro-instructions. According to the decoded micro-instructions, the direct memory access unit 102 may be configured to read data of a weight matrix for the slave computation modules 114 from an external address space.

At block 610, the controller unit 106 may configured to read a CONFIG instruction from the instruction caching unit 104 and decode the CONFIG instruction into micro-instructions. The CONFIG instruction may include various constants required in the operation of the current layer before the computation of artificial neural networks of each layer starts. According to the decoded micro-instructions, the master computation unit 302 and/or the slave computation unit 402 may be configured to preset values of the registers according to the parameters in the micro-instructions. The parameters, for example, may include data of calculation accuracy setting and activation function of this layer (for instance, the accuracy bit of calculation of current layer, the rang parameter of Lrn layer algorithm, the reciprocal of the window size of the AveragePooling layer algorithm).

At block 612, the controller unit 106 may be configured to read a COMPUTE instruction from the instruction caching unit 104 and decode the COMPUTE instruction into micro-instructions. The COMPUTE instruction may include information for performing the arithmetic logical calculation of artificial neural networks of each layer. According to the decoded micro-instructions, the master computation module 112 may be configured to transmit the input vector or a segment of the input vector to respective slave computation modules 114 via the interconnection unit 108. The input vector may be stored in the slave neuron caching unit 406 in each of the slave computation modules 114.

At block 614, according to the micro-instructions decoded from the COMPUTE instruction, the slave computation unit 402 of the slave computation module 114 may be configured to read a weight vector from the weight value caching unit 408 (e.g., a row vector in the weight matrix corresponding to the slave computation module 114). The slave computation unit 402 may be configured to further read the input vector from the slave neuron caching unit 406 and completes the multiplication (e.g., a dot product operation) between the weight vector and the input vector to generate a slave output value. Slave output values from different slave computation modules 114 may be transmitted to the interconnection unit 108.

At block 616, the slave output values returned from the slave computation modules 114 may be combined into an intermediate result vector.

At block 618, the master computation module 112 may be configured to obtain the intermediate result vector returned by the interconnection unit 108. The master computation module 112 may be further configured to perform a bias operation. For example, a bias vector may be read from the master neuron caching unit 306 and added to the intermediate result vector. The biased vector may be further activated in accordance with an activation function to generate an output vector. The output vector may be written back to the master neuron caching unit 306.

At block 620, the controller unit 106 may be configured to read a fourth IO instruction from the instruction caching unit 104 and decode the fourth IO instruction into micro-instructions. According to the micro-instructions, the direct memory access unit 102 may be configured to store the output vector in the master neuron caching unit 306 to a specified address of an external address space.

For a multi-layer artificial neural network, its implementation is similar to the implementation of a single-layer neural network. When the execution of the artificial neural network of the previous layer completes, the operation instruction of the next layer uses the output neuron address of the previous layer stored in the master operation unit as the input neuron address of this layer. Similarly, the weight address and bias address in the instruction will turn into the addresses corresponding to the current layer.

The utilization of the apparatus and instruction set for performing the forward computation of artificial neural networks eliminates the defects caused by lower performance of CPU and GPU operation as well as high overhead of front-end transcoding, which effectively improves the support to forward computations of multi-layer artificial neural networks.

In addition, the utilization of a specific on-chip cache for the forward computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the forward computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation.

We claim:

1. An apparatus for forward propagation in fully connected layers of a multilayer neural network, comprising:
    a master computation module configured to transmit an input vector via an interconnection unit; and
    multiple slave computation modules configured to parallelly calculate multiple groups of slave output values based on the input vector received via the interconnection unit, wherein the master computation module is configured
        to receive an intermediate result vector combined by the interconnection unit based on the multiple groups of slave output values calculated by the multiple slave computation modules, and
        to generate an output vector based on the intermediate result vector.

2. The apparatus of claim 1, wherein the master computation module is configured to perform one operation selected from the group consisting of:
    adding a bias value to the intermediate result vector;
    activating the intermediate result vector with an activation function;

outputting a predetermined value based on a comparison between the intermediate result vector and a random number; and pooling the intermediate result vector.

3. The apparatus of claim 1, wherein each of the slave computation modules includes a slave neuron caching unit configured to store the input vector.

4. The apparatus of claim 1, wherein the interconnection unit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

5. The apparatus of claim 1, further comprising a controller unit configured to decode an instruction into one or more groups of micro-instructions, wherein the plurality of computation modules are configured to perform respective groups of the micro-instructions.

6. The apparatus of claim 5, wherein the master computation module includes:
a master neuron caching unit configured to cache data;
a master computation unit configured to perform the selected operation;
a master data dependency relationship determination unit configured to prevent the instruction from being executed based on a determination that a conflict exists between the instruction and other instructions.

7. The apparatus of claim 5, wherein the slave computation module includes:
a slave computation unit configured to receive the one or more groups of micro-instructions and to perform arithmetic logical operations;
a slave data dependency relationship determination unit configured to perform reading/writing operations to a slave neuron caching unit, a weight value caching unit, and a weight gradient caching unit based on a determination that no conflict exists between the reading/writing operations; and
a weight value caching unit configured to store weight vectors.

8. The apparatus of claim 7, wherein the slave data dependency relationship determination unit configured to
determine whether there is dependent relationship between a first micro-instruction which has not been executed and a second micro-instruction which is being executed;
if there is no dependent relationship, allow the micro-instruction which has not been executed to be executed immediately, otherwise, the micro-instruction which has not been executed will not be allowed to execute until the execution of all the micro-instructions upon which that micro-instruction which has not been executed depend is completed.

9. The apparatus of claim 5, wherein the instruction is selected from the group consisting of
a CONFIG instruction for configuring constants required by computation of the current layer prior to starting computation of the artificial neural network of each layer,
a COMPUTE instruction for completing arithmetical logic computation of the multilayer neural network of each layer, and an IO instruction for reading in the input data required by computation from an external address space and storing the data back into the external space after completion of computation.

10. The apparatus of claim 5, further comprising:
an instruction caching unit configured to store the instruction; and
a direct memory access unit configured to transmit data to the computation modules from an external storage device and receive data from the computation modules to the external storage device.

11. A method for forward propagation in fully connected layers of a multilayer neural network, comprising:
transmitting, by a master computation module, an input vector via an interconnection unit;
parallelly calculating, by multiple slave computation modules, multiple groups of slave output values based on the input vector received via the interconnection unit;
combining, by the interconnection unit, the multiple groups of slave output values to generate an intermediate result vector; and
generating, by a master computation module, an output vector based on the intermediate result vector.

12. The method of claim 11, further comprising:
receiving, by a controller unit, an instruction;
decoding, by the controller unit, the instruction into one or more groups of micro-instructions; and
assigning, by the controller unit, the one or more groups of micro-instruction respectively to the multiple slave computation modules and the master computation module.

13. The method of claim 12, further comprising performing an operation selected from the group consisting of:
adding a bias value to the intermediate result vector;
activating the intermediate result vector with an activation function;
outputting a predetermined value based on a comparison between the intermediate result vector and a random number; and
pooling the intermediate result vector.

14. The method of claim 11, further comprising storing, by a slave neuron caching unit included in each of the slave computation modules, the input vector.

15. The method of claim 11, wherein the interconnection unit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

16. The method of claim 12, further comprising:
caching data by a master neuron caching unit included in the mast computation module; and
preventing, by a master data dependency relationship determination unit, the instruction from being executed based on a determination that a conflict exists between the instruction and other instructions.

17. The method of claim 11, further comprising:
receiving, by a slave computation unit included in the slave computation module, the one or more groups of micro-instructions;
performing arithmetic logical operations according to the micro-instructions;
perform, by a slave data dependency relationship determination unit, reading/writing operations to a slave neuron caching unit, a weight value caching unit, and a weight gradient caching unit based on a determination that no conflict exists between the reading/writing operations; and storing, by a weight value caching unit include in the slave computation module, weight vectors.

18. The method of claim 17, further comprising:

determining, by the slave data dependency relationship determination unit, whether there is dependent relationship between a first micro-instruction which has not been executed and a second micro-instruction which is being executed;

allowing, by the slave data dependency relationship determination unit, the micro-instruction which has not been executed to be executed immediately if there is no dependent relationship;

preventing, by the slave data dependency relationship determination unit, the micro-instruction which has not been executed from being executed if dependent relationship exists.

19. The method of claim 12, wherein the instruction is selected from the group consisting of a CONFIG instruction for configuring constants required by computation of the current layer prior to starting computation of the artificial neural network of each layer, a COMPUTE instruction for completing arithmetical logic computation of the multilayer neural network of each layer, and an IO instruction for reading in the input data required by computation from an external address space and storing the data back into the external space after completion of computation.

20. The method of claim 12, further comprising:

storing, by an instruction caching unit, the instruction;

transmitting data, by a direct memory access unit, to the computation modules from an external storage device; and receiving data, by a direct memory access unit, from the computation modules to the external storage device.

* * * * *